United States Patent
Carreiro et al.

(10) Patent No.: US 7,582,334 B2
(45) Date of Patent: Sep. 1, 2009

(54) METHOD TO ACCELERATE WETTING OF AN ION EXCHANGE MEMBRANE IN A SEMI-FUEL CELL

(75) Inventors: Louis G. Carreiro, Westport, MA (US); Charles J. Patrissi, Newport, RI (US); Steven P. Tucker, Portsmouth, RI (US)

(73) Assignee: The United States of America as represented by the Secretary of the Navy, Wahington, DC (US)

( * ) Notice: Subject to any disclaimer, the term of this patent is extended or adjusted under 35 U.S.C. 154(b) by 805 days.

(21) Appl. No.: 10/923,611

(22) Filed: Aug. 11, 2004

(65) Prior Publication Data
US 2009/0196983 A1      Aug. 6, 2009

(51) Int. Cl.
B05D 1/18         (2006.01)
(52) U.S. Cl. .................. 427/430.1; 427/443.1
(58) Field of Classification Search ............. 427/430.1, 427/443.2
See application file for complete search history.

(56) References Cited

U.S. PATENT DOCUMENTS

| 4,000,057 | A | * | 12/1976 | Mrazek et al. ............. 204/296 |
| 4,381,979 | A | * | 5/1983 | De Nora et al. ............. 205/531 |
| 4,423,157 | A | * | 12/1983 | Masuda ....................... 521/27 |
| 4,595,476 | A | | 6/1986 | Bissot |
| 4,904,701 | A | | 2/1990 | Hiyoshi et al. |
| 5,066,682 | A | | 11/1991 | Miyazaki et al. |
| 5,164,060 | A | | 11/1992 | Eisman et al. |
| 5,310,765 | A | | 5/1994 | Banerjee et al. |
| 6,156,451 | A | | 12/2000 | Banerjee et al. |
| 6,196,227 | B1 | | 3/2001 | Tsushima |
| 6,228,527 | B1 | | 5/2001 | Medeiros et al. |
| 6,465,124 | B1 | | 10/2002 | Medeiros et al. |

* cited by examiner

*Primary Examiner*—Timothy H Meeks
*Assistant Examiner*—David Turocy
(74) *Attorney, Agent, or Firm*—James M. Kasischke; Jean-Paul A. Nasser; Michael P. Stanley

(57) ABSTRACT

A new treatment method for ion exchange membranes used in semi-fuel cells that accelerates the wetting of the membranes by aqueous electrolyte solutions, thus reducing the start up time for metal/hydrogen peroxide-based semi-fuel cells. Specifically, a NAFION® membrane that is intended for dry storage in a semi-fuel cell is treated with glycerin (glycerol) to enhance its rate of absorption of electrolyte solution when the semi-fuel cell is activated.

11 Claims, No Drawings

METHOD TO ACCELERATE WETTING OF AN ION EXCHANGE MEMBRANE IN A SEMI-FUEL CELL

STATEMENT OF GOVERNMENT INTEREST

The invention described herein may be manufactured and used by or for the Government of the United States of America for governmental purposes without the payment of any royalties thereon or therefore.

CROSS REFERENCE TO OTHER RELATED APPLICATIONS

This patent application is co-pending with a related patent application entitled HIGH EFFICIENCY SEMI-FUEL CELL INCORPORATING AN ION EXCHANGE MEMBRANE (Navy Case No. 82737), by, Maria G. Medeiros, Eric G. Dow, employees of the United States government, Russell R. Bessette, Susan G. Yan, and Dwayne W. Dischert.

BACKGROUND OF THE INVENTION (1) Field of the Invention

The present invention relates to semi-fuel cells, and more specifically to a new treatment for ion exchange membranes that accelerates the wetting of the membranes by aqueous electrolyte solutions, thus reducing the start up time for metal/hydrogen peroxide-based semi-fuel cells.

(2) Description of the Prior Art

A semi-fuel cell is essentially a hybrid of fuel cells and batteries. Combining the refillable cathode or catholyte oxidizer of fuel cells with the consumable anode fuel of batteries. Semi-fuel cells are currently under investigation as electrochemical power sources for unmanned undersea vehicles. In a semi-fuel cell, a metal anode, such as magnesium or aluminum along with a liquid catholyte, typically a strong oxidizer like hydrogen peroxide, are consumed to produce energy. The electrochemical reaction is given below for magnesium with hydrogen peroxide in acid media.

| Anode: | $Mg \rightarrow Mg^{2+} + 2e^-$ | | 2.37 v |
|---|---|---|---|
| Cathode: | $H_2O_2 + 2H^+ + 2e^-$ | $2H_2O$ | 1.77 v |
| Cell Reaction: | $Mg + H_2O_2 + 2H^+$ | $Mg^{2+} + 2H_2O$ | 4.14 v |

In addition to the primary electrochemical reaction, several parasitic reactions can also take place.

Decomposition: $2H_2O_2 \rightarrow 2H_2O + O_2$

Direct Reaction $Mg + H_2O_2 + OH^- \rightarrow Mg^{2+} + 3OH^-$

Corrosion: $Mg + 2H_2O \rightarrow Mg^{2+} + 2OH^- + H_2$

Of the three parasitic reactions listed above, the direct reaction is the most detrimental to the operation of the semi-fuel cell since both magnesium and hydrogen peroxide are consumed in a single step. Whereas magnesium corrosion can be suppressed by pH adjustment and hydrogen peroxide decomposition minimized by careful temperature control, prevention of the direct reaction requires that the magnesium anode and hydrogen peroxide catholyte be physically separated from each other. To accomplish this, a semi-permeable membrane capable of ion exchange is placed between the anode and cathode compartments of the semi-fuel cell in order to isolate the anolyte and catholyte solutions.

In order for ionic transport to occur across a membrane, the membrane must first absorb the electrolyte solution. The membrane's rate of absorption determines how quickly the semi-fuel cell reaches its operating voltage. In most applications, semi-fuel cells are stored "dry" to prevent corrosion of the magnesium anode. When electrical energy is needed, the semi-fuel cell's anode and cathode compartments are flooded with electrolyte so that power generation can begin. The membrane must then wet immediately upon contact with the electrolyte, so that the semi-fuel cell can begin to supply power. In the situation where the semi-fuel cell is being used with an unmanned underwater vehicle, the requirement for power generation is within seconds of the vehicle's deployment. Ion exchange membranes, such as NAFION®, require a long pre-soak period (at least 12 hours) in aqueous electrolyte solution in order to be fully wet and therefore fully functional in a semi-fuel cell. A method to accelerate the wetting of the membrane is needed.

Several prior art methods exist for treating a NAFION® membrane to make its performance more consistent and reproducible. However, these techniques are designed to remove impurities from the manufacturing process and/or exposure to the environment rather than enhance the membrane's ability to absorb liquid. Typical treatments involve boiling the membrane in dilute acid followed by rinsing in boiling distilled water. After treatment, the membrane must remain wet prior to use.

What is needed is a method that will allow an ion exchange membrane such as a NAFION® membrane in a semi-fuel cell to be stored dry and then to wet immediately when the semi-fuel cell is activated.

SUMMARY OF THE INVENTION

It is a general purpose and object of the present invention to provide a method to increase the rate of absorption of electrolyte solution by a Nafion® membrane.

This object is accomplished with the present invention by providing a treatment method whereby a Nafion® membrane is treated with glycerin (glycerol) to enhance its rate of absorption of electrolyte solution

BRIEF DESCRIPTION OF THE DRAWINGS

None.

DESCRIPTION OF THE PREFERRED EMBODIMENT

The following is a detailed description of the treatment method of the present invention. In the preferred embodiment a membrane made of NAFION®, is used as the separating membrane in a semi-fuel cell, however, other perfluorinated ionomer membranes such as FLEMION® and ACIPLEX-XR® could also be used. In the preferred embodiment, the treatment method is applied to NAFION® membranes NE-112, NE-1135, N-115 and N-117. Initially the membrane is immersed in 1.5 M $H_2SO_4$ for 48 hours. The membrane is then removed from the $H_2SO_4$ and rinsed in distilled and or deionized $H_2O$. The membrane is then soaked in distilled and or deionized $H_2O$ for 24 hours. The membrane is then removed from the $H_2O$ and then again rinsed in more distilled and or deionized $H_2O$. The membrane is then immersed in a polyhdric alcohol for 48 hours. In the preferred embodiment of the method the polyhdric alcohol is glycerin. After 48 hours the membrane is removed from the glycerin and once again rinsed in distilled and or deionized $H_2O$. Finally the membrane is dried in air for at least 48 hours prior to use.

Once treated in this manner, the NAFION® membrane may be installed in the semi-fuel cell in the dry state and is ready to instantaneously absorb electrolyte when the semi-fuel cell's anode and cathode compartments are flooded with electrolyte, thus allowing power generation to occur immediately.

The advantages of the present invention over the prior art are that the present invention allows a NAFION® ion exchange membrane to be stored dry within a semi-fuel cell module. This is critical since the magnesium anode of a semi-fuel cell must also be stored dry to prevent its corrosion. Upon activation of the semi-fuel cell, the NAFION® membrane treated according to the method of the present invention instantly allows ionic transport to readily take place between the anode and cathode compartments. The semi-fuel cell is then able to generate and maintain sufficient voltage. In the situation where a semi-fuel cell is used to power an unmanned underwater vehicle, the present invention will reduce the vehicle's dependence on standby/auxiliary batteries.

What has thus been described is a new treatment method for ion exchange membranes used in semi-fuel cells that accelerates the wetting of the membranes by aqueous electrolyte solutions, thus reducing the start up time for metal/hydrogen peroxide-based semi-fuel cells.

Obviously many modifications and variations of the present invention may become apparent in light of the above teachings. For example different types of ion exchange membranes may be used. Different polyhydric alcohols may be used.

In light of the above, it is therefore understood that within the scope of the appended claims, the invention may be practiced otherwise than as specifically described.

What is claimed is:

1. A method for treating a perflourinated ionomer membrane to increase said membrane's rate of absorption of electrolyte solution, which comprises:
    immersing said membrane in $H_2SO_4$;
    removing said membrane from $H_2SO_4$;
    then immersing said membrane in $H_2O$;
    removing said membrane from $H_2O$; and
    then immersing said membrane in glycerin.

2. A method in accordance with claim 1 wherein immersing said membrane in $H_2SO_4$ comprises immersion of the membrane in 1-2 M $H_2SO_4$ for at least 48 hours.

3. A method in accordance with claim 1 wherein immersing said membrane in $H_2O$ comprises soaking said membrane in distilled $H_2O$ for at least 24 hours.

4. A method in accordance with claim 1 wherein immersing said membrane in $H_2O$ comprises soaking said membrane in deionized $H_2O$ for at least 24 hours.

5. A method in accordance with claim 1 wherein immersing said membrane in glycerin comprises immersion of the membrane in glycerin for at least 48 hours.

6. A method in accordance with claim 2 further comprising:
    rinsing said membrane in distilled $H_2O$ after removing said membrane from the 1-2 M $H_2SO_4$ solution after the at least 48 hours have elapsed and prior to immersing said membrane in $H_2O$.

7. A method in accordance with claim 3 further comprising:
    rinsing said membrane in distilled $H_2O$ after removing said membrane from said distilled $H_2O$ after the at least 24 hours have elapsed and prior to immersing said before said membrane in glycerin.

8. A method in accordance with claim 5 further comprising:
    rinsing said membrane in distilled $H_2O$ after removing said membrane from said glycerin after the at least 48 hours have elapsed.

9. A method in accordance with claim 8 further comprising the step of:
    drying said membrane in air for at least 48 hours after rinsing said membrane in distilled $H_2O$.

10. A method for treating a perflourinated ionomer membrane to increase said membrane's rate of absorption of electrolyte solution in a semi-fuel cell, comprising the sequential steps of:
    immersing said membrane in 1-2 M $H_2SO_4$ for at least 48 hours;
    removing said membrane from the 1-2 M $H_2SO_4$ solution after at least 48 hours have elapsed;
    rinsing said membrane in distilled and deionized $H_2O$;
    soaking said membrane in said distilled and deionized $H_2O$ for at least 24 hours;
    removing said membrane from the distilled and deionized $H_2O$ after at least 24 hours have elapsed;
    rinsing said membrane in distilled and deionized $H_2O$;
    immersing said membrane in glycerin for at least 48 hours;
    removing said membrane from the glycerin after at least 48 hours have elapsed;
    rinsing said membrane in distilled and deionized $H_2O$; and
    drying said membrane in air for at least 48 hours prior to use.

11. A method in accordance with claim 10 wherein the membrane is a perfluorinated ionomer membrane selected from the group consisting of NAFION®, FLEMION®, and ACIPLEX-XR®.

* * * * *